United States Patent [19]

Backlund

[11] 4,372,872

[45] Feb. 8, 1983

[54] SULFUR SUSPENSIONS

[75] Inventor: Peter S. Backlund, Anaheim, Calif.

[73] Assignee: Union Oil Company of California, Brea, Calif.

[21] Appl. No.: 234,465

[22] Filed: Feb. 17, 1981

[51] Int. Cl.$^3$ ............................................. B01J 13/00
[52] U.S. Cl. ............................... 252/313 R; 71/64.08; 71/64.09; 252/314
[58] Field of Search ........................... 252/313 R, 314; 71/64.08, 64.09

[56] References Cited

U.S. PATENT DOCUMENTS

| | | |
|---|---|---|
| 1,969,242 | 8/1934 | Szegvari . |
| 2,190,922 | 2/1940 | Heath et al. . |
| 2,332,934 | 10/1943 | Rollo et al. . |
| 2,348,736 | 5/1944 | Heath . |
| 2,658,016 | 11/1953 | Brown et al. . |
| 3,509,066 | 4/1970 | Jacobs et al. ................... 252/313 R |
| 3,637,351 | 1/1972 | Young et al. ......................... 23/224 |
| 3,799,884 | 3/1974 | Young .............................. 252/315 R |
| 4,256,691 | 3/1981 | Ott ................................. 71/64.08 X |

*Primary Examiner*—Lucille M. Phynes
*Attorney, Agent, or Firm*—Dean Sandford; Gregory F. Wirzsbicki; Robert A. Franks

[57] ABSTRACT

A high shear mixer is used to prepare sulfur particles for soil application. In one embodiment, molten sulfur is added to an aqueous medium being subjected to agitation by a high shear mixer, producing a suspension containing substantial amounts of sulfur with a particle size of less than 200 mesh.

22 Claims, No Drawings

SULFUR SUSPENSIONS

BACKGROUND OF THE INVENTION

Elemental sulfur has found considerable utility in agriculture as a soil amendment, particularly for high-clay, alkaline soils, and as a source of sulfur (in the form of sulfate) for plant growth. Two forms are generally used for direct soil application: aqueous sulfur suspensions, similar to the very common suspension fertilizers, and dry sulfur particles. Both require that the sulfur be in a particulate form. However, it is readily apparent that different particle sizes are required, since only very fine particles will form suspensions having desirable stability and flow properties, while considerably larger particles are desired to prevent dusting and other handling problems for dry application.

The more common sources of sulfur are the Frasch process mines, in which heated water or steam is injected into underground sulfur deposits to melt the sulfur, whereupon it is pumped to the surface, and the conversion of hydrogen sulfide, extracted from petroleum refinery process streams, into elemental sulfur. In either instance, the produced sulfur is usually made available in the molten state, and then is discharged into a storage area to solidify into large blocks.

Upon breaking the blocks, the sulfur can be ground into the required sizes (usually 100 to 200 mesh) for suspension production. This grinding, however, must be conducted with great care and under an inert atmosphere, due to the flammability of sulfur and the explosive tendencies of sulfur dust.

Although the fluid sulfur suspensions are a very convenient source, from the standpoint of application ease, they create serious storage problems. The finely divided sulfur which is used in the preparation of suspensions is itself difficult to store because of its tendency to dust or cake into large chunks. In addition, the previously noted flammability and explosion hazards remain as problems during storage.

These storage problems can be alleviated by converting the sulfur to aqueous suspensions, but the result is a rather inefficient utilization of expensive tankage, due to the fact that even the most concentrated sulfur suspensions commonly used (50 to 60 weight percent sulfur) contain 40 or more percent by weight of water. Because of this, the suspensions can require twice as much storage volume as would the dry sulfur particles. Furthermore, the air oxidation of sulfur gradually produces sulfuric acid, requiring that more expensive corrosion-resistant materials be used for long-term suspension storage.

To save shipping expenses, the sulfur suspensions are usually prepared at a fertilizer blending plant located in a rural area near the location where the suspensions are to be applied. These plants are typically quite small and equipped with only simple mixing equipment and some storage tanks. They are not customarily able to perform the technically difficult, hazardous operations such as grinding sulfur into fine particles. For this reason, sulfur for suspensions must be purchased in the required small particle size, resulting in a rather expensive suspension product.

U.S. Pat. No. 3,799,884 to Young, which is incorporated herein by reference, describes a sulfur suspension which can be prepared from particles of a special porous sulfur (as disclosed in U.S. Pat. No. 3,637,351 to Young et al.) having a size generally greater than 50 mesh. The preparation involves adding porous sulfur particles to water, contained within the storage tank of an apparatus used for application of a suspension to the soil or plants, and pumping the mixture in a closed circulation system through the pump of the applicator and back into the storage tank. After prolonged pump operation, the particles are reduced in size by grinding inside the pump housing to a point at which they can be applied. Advantages claimed for the invention include the ability to use a sulfur source more convenient than finely ground sulfur, and the elimination of suspension settling problems during transportation, since suspensions are produced at the site where they are to be used.

The process of Young, however, does not produce a suspension which is equivalent to those which are commercially used, due to the somewhat larger particle sizes which are measured after the practice of his invention (e.g., the obtaining of only about 12 percent by weight of particles which will pass through a 200 mesh sieve in Example 3 of the patent, even after prolonged grinding). These suspensions probably could not be easily re-dispersed after even a short period of shipment, so must always be prepared at the location of their ultimate use. In addition, the process suffers from the need for quite lengthy circulation times through the pump system to achieve a useful suspension. A further limitation of the process is its inability to utilize molten sulfur as a feed material, which is the least expensive form available in some areas.

Accordingly, it is an object of the present invention to provide sulfur suspensions containing substantial amounts of particles smaller than about 200 mesh without utilizing finely ground sulfur as a starting material.

It is a further object to permit the use of equipment normally present in fertilizer blending plants for preparing sulfur suspensions.

A still further object is the use of molten sulfur to prepare sulfur suspensions in a single vessel, using an uncomplicated process.

Another object is the use of molten sulfur to prepare a mixture, in the desired proportions, of sulfur suspension and non-dusting sulfur particles which can be stored for subsequent application to the soil or processing into sulfur suspension.

These, and other objects will more clearly appear from consideration of the following description and examples.

SUMMARY OF THE INVENTION

The invention resides in a process for producing particles of sulfur, utilizing a high shear mixing device. A suspension of sulfur can be produced by (a) agitating an aqueous medium, contained within a vessel, with a high shear mixer; and (b) introducing sulfur into the agitated medium. Optionally, a clay thickener can be added to the suspension for additional stability against settling.

Sulfur feed for the process can be either particulate or molten elemental sulfur. The aqueous medium can be water or a solution or suspension fertilizer material, depending upon the desired properties of the product suspension.

For molten sulfur feed material, the process can be conducted in such a manner as to simultaneously produce a sulfur suspension for proximate use and non-dusting sulfur particles for longer-term storage, each form being produced in its desired proportion. The sulfur particles can subsequently be easily reprocessed, using the same equipment, when additional suspension is desired, or can be applied to the soil in particulate form.

DESCRIPTION OF THE INVENTION

The objects of this invention are achieved by a process which comprises the steps of (a) agitating an aqueous medium, contained within a vessel, using a high shear mixer; and (b) introducing sulfur into the agitated medium.

High shear mixing equipment which can be utilized for conducting the process includes that typically present in a fertilizer blending plant for preparing large batches of suspension fertilizer compositions. Such equipment normally comprises a large vessel, which can be resting on scales for weighing the vessel as materials are added, fitted with the high shear mixing device, which is usually a specially designed impeller on a shaft driven by an electric motor. In addition, the vessel has various inlet and outlet openings, with the associated conduits for adding and removing material. Some vessels are also equipped with additional mixing means, comprising either an agitator or a recycle pump system which removes material from the vessel and reintroduces it to another area of the vessel, for maintaining a formed dispersion after the high shear mixer has been stopped.

The mixing equipment is available in a variety of sizes, typically suitable for preparing batches of suspension fertilizer which weigh up to several tons. Manufacturers of equipment which can be used for the practice of the invention include, without limitation, Bard and Bard Co. (Vav-U-Mac TM and Mixers), Morehouse Industries Inc. (Cowles Dissolver), and Ferguson Industries (Fert-O-Batcher TM).

Designs of high shear mixer impellers vary considerably according to the manufacturer of a particular piece of equipment. Some manufacturers produce a disc-shaped metal impeller having tooth-like projections in the plane of the disc (similar in appearance to the blade of a circular saw) or perpendicular to the plane of the disc. Other manufacturers produce radically different designs, such as, for example, the Vac-U-Mac TM "turbine" impeller which draws material to be mixed into its interior along the axis of the driving shaft, and then expels the material in a violent stream perpendicular to that axis.

Although differing types of impellers and mixers are available, it has been found that the actual configuration used does not affect the ability to practice this invention; an effect is noted only on the efficiency of the process. It is only necessary that the mixing device chosen provides high shear forces, in approximately the same order of magnitude as those commercial units described herein.

The aqueous medium can be water or an aqueous-based plant nutrient solution or suspension, of which numerous types are known to the agricultural industry. Some examples of nutrient solutions which can be used are urea solutions, ammonium nitrate solutions, ammonia solutions, potassium solutions prepared from potassium chloride, sulfate or nitrate, urea-sulfuric acid solutions, and mixtures of these and other nutrient solutions. Suspensions which can be used include those ammonium phosphate compositions with or without added potassium which are commercially available, having compositions described (in accordance with industry practice) as 10-30-0, 11-34-0, etc., suspensions containing urea, with or without other nitrogen or additional nutrient materials, potassium chloride suspensions, and the like. Both solutions and suspensions can also contain added trace nutrients without adversely affecting the practice of this invention.

Sulfur which is used in this invention can be particulate, preferably with particle sizes of one-half inch or smaller, or molten sulfur, affording an ability to use the more economical sulfur supply in achieving a lower cost product. If molten sulfur is used, it is possible (as will be further explained, infra) to operate the process in such a manner as to prepare the desired amount of sulfur suspension and convert the remaining sulfur to easily stored, non-dusting sulfur particles, thereby obviating the necessity to provide heated storage vessels for maintaining sulfur in a molten state until additional suspension is required. The prepared particles can be reprocessed as desired to form additional sulfur suspension, or can be applied to the soil in particulate form without further processing.

Various modifications to the basic process described, supra, can be made without substantially altering the practice of the invention, for tailoring the process to a particular raw material or end use. Such modifications include the use of a surfactant material to improve the wettability of sulfur, decrease foaming and increase the amoung of very small particles produced, and the addition of a clay thickener to impart greater long-term storage stability to an aqueous suspension.

A number of surfactant materials are useful in the practice of the invention to promote the wetting of the very hydrophobic sulfur, decrease foaming and frothing in the mixer and increase the formation of very fine particles. The amount of surfactant which is needed depends upon the particular materials present and the particle sizes to be prepared and is normally in the range of about 0.05 to about 5 percent by weight. These surfactants are primarily nonionic, as exemplified by Witco 912 (Witco Chemical Corporation), Triton X45, X100 and X114 Rohm and Haas Company), TMulz AO2 (Thompson-Hayward Chemical Company), and several others. Of those listed, TMulz AO2, an ethoxylated alkyl phenol, is especially preferred.

In addition to the benefits noted, supra, the addition of small amounts of surfactant (0.05 to 0.5 percent by weight) to sulfur suspensions greatly reduces the corrosivity of the suspensions to mild steel. The use of at least about 0.1 percent by weight of TMulz AO2 has been found to be particularly effective in this regard, as well as being sufficient to prevent objectionable levels of frothing.

Typically, surfactant is added to the aqueous medium prior to the introduction of sulfur. This is the preferred method for particulate sulfur feed, but is merely a matter of convenience for molten sulfur, since the effect of surfactant addition upon molten sulfur feed can sometimes be enhanced by mixing the surfactant with the sulfur, before introduction to the aqueous medium.

Clay thickeners which are useful in the practice of this invention include those which are employed in the production of suspension fertilizer materials. These clays are usually colloidal or near-colloidal attapulgites, sepiolites, bentonites, etc., and are "gelled" by the addition of ionic materials such as potassium chloride or other fertilizer compounds, preferably after dispersion of the clay in a sulfur suspension. Sufficient clay is used to obtain the desired stability and rheological properties, but normally not more than about five percent by weight is needed.

When molten sulfur is used as the feed material for the process, it is possible to exercise some control over the product particle size distribution. For a standard cylindrical mixing vessel, adding the sulfur near the periphery of the agitated aqueous medium results in the maximized formation of larger particles (greater than 20 mesh) and a minimized formation of fines (less than 200 mesh). By attaching a baffle to the inner wall of the vessel, perpendicular to the plane of the high shear impeller, the contents of the vessel are recycled toward the center, resulting in fewer large particles and more fine particles.

Introducing the molten sulfur into the vortex created by the high shear impeller can nearly eliminate the large particles, while only moderately increasing the production of fines. For a maximum amount of fine particles, sulfur should be added to the area of the high shear impeller in multiple small streams.

The invention is further illustrated by the following examples which are illustrative of various aspects of the invention, and are not intended as limiting the scope of the invention as defined by the appended claims. In the examples, all percentages are expressed on a weight basis unless otherwise noted. The symbols + and −, used in screen analysis results, indicate the weight percentage of material retained by, or passing through, respectively, a particular sieve size.

EXAMPLE 1

An experiment is performed to determine the difference in particle size distribution which is obtained when molten sulfur is added to an aqueous medium which is subjected to vigorous agitation with a high shear mixer or a typical laboratory stirrer. A Waring blender, operated with a peripheral blade velocity of about 5000 feet per minute, is the high shear mixer, while a Lightnin mixer, equipped with a propeller-type blade revolving at about 1200 revolutions per minute, serves as the stirrer.

The experiment is for preparing a suspension containing about 45 percent sulfur. In the experiment, TMulz AO2 is a nonionic surfactant which promotes sulfur wetting, and Minugel is an attapulgite clay thickener (Floridin Company) added as a 25 percent slurry in water. The potassium chloride and ammonium polyphosphate solution (analysis 10-34-0: 10 percent nitrogen, 34 percent phosphorus) are added to promote gelling of the clay. The sulfur is in a molten state, at about 260° F.

In Test A, sulfur is poured into water, agitated with a Waring blender, and the agitation is stopped as soon as all addition is complete. Test B uses the same procedure, except for agitation with a Lightnin mixer. For Test C, the product from Test B is allowed to stand overnight at room temperature, and then is mixed for about two minutes in a Waring blender. In Test D, all ingredients except sulfur are agitated by the Waring blender, and sulfur is added to the thickened mixture. Test E is the addition of sulfur to a Waring blender containing water and TMulz AO2, with the remaining ingredients being added two minutes after all sulfur has been added.

Results are as shown in Table I.

TABLE I

| Test | Component, grams | | | | |
|---|---|---|---|---|---|
| | A | B | C | D | E |
| Water | 330 | 330 | — | 270 | 270 |
| TMulz AO2 | — | — | — | 0.6 | 0.6 |
| 25% Minugel | — | — | — | 48 | 48 |
| Potassium Chloride | — | — | — | 6 | 6 |
| 10-34-0 | — | — | — | 6 | 6 |
| Sulfur | 270 | 270 | — | 270 | 270 |
| Final Temperatures, °C. | 46 | 49 | — | 51 | 50 |
| Screen Analysis, percent | | | | | |
| +20 mesh | 0 | 81.6 | 0 | 0 | 0 |
| +50 | 4.5 | 12.3 | 2.0 | 24.4 | 24.8 |
| +100 | 29.0 | 3.1 | 44.0 | 31.5 | 22.0 |
| +200 | 15.3 | 1.2 | 28.8 | 15.7 | 11.3 |
| −200 | 51.2 | 1.8 | 25.2 | 28.5 | 41.9 |

These results clearly indicate the superiority of the high shear mixer (Test A) over the typical stirrer (Test B) in preparing small particle sizes from molten sulfur. In addition, it is shown (Test C) that the larger particles produced by the stirrer can be easily reduced in size by the high shear mixer.

EXAMPLE 2

The addition of elemental sulfur to suspension and solution fertilizer materials using high shear mixers is studied with a Waring blender. Stable suspensions are produced by adding molten sulfur to fertilizer material which is agitated in a Waring blender, with a peripheral blade velocity of about 5000 feet per minute, for about two minutes. Results are obtained as follows in Table II.

TABLE II

| Components | | Viscosity | | |
|---|---|---|---|---|
| % Sulfur | % Fert. [Analysis] | Centi-poise | pH | Product Analysis |
| 20 | 80 [11-34-0] | 3,450 | 6.4 | 9-27-0-20(S) |
| 30 | 70 [11-34-0] | 4,710 | 6.5 | 8-24-0-30(S) |
| 30 | 70 [0-0-30] | 4,560 | 8.8 | 0-0-21-30(S) |
| 20 | 80 [34-0-0] | 3,550 | 7.5 | 27-0-0-20(S) |
| 30 | 70 [34-0-0] | 3,900 | 7.5 | 24-0-0-30(S) |
| 50 | 50 [20-0-0] | 3,440 | 8.6 | 10-0-0-50(S) |
| 20 | 80 [15-0-0-0.25(B)] | 400 | 8.7 | 12-0-0-20(S)-0.2(B) |

In this table and the following examples, analyses are expressed as percentage compositions in the order nitrogen-phosphorus-potassium-(other), in accordance with standard fertilizer industry practice. This 11-34-0 material is an ammonium polyphosphate suspension, thickened with 1.5 percent Sepiogel A (Industrial Mineral Ventures). The 0-0-30 is a potassium chloride suspension, thickened with three percent Minugel (Floridin Company). The 34-0-0 composition is a urea suspension, thickened with one percent Sepiogel (Industrial Mineral Ventures). The 20-0-0 and 15-0-0.25(B) materials of this example are clay gelled urea solutions.

Viscosity measurements are made with a Brookfield viscometer, using a number 4 spindle at 20 r.p.m. The measurements are made at room temperature. It is preferred that the product visclosity fall within the range of 500 to 5,000 centipoise. Although suspensions having less than about 500 centipoise are useful, they are more likely to settle during storage than higher viscosity compositions. Also, suspensions having a viscosity of up to about 10,000 centipoise can be used but materials over about 5,000 centipoise are more difficult to transfer with pumps, and cause problems by adhering to vessel walls.

EXAMPLE 3

An experiment is performed to demonstrate the utility of high shear mixers in preparing granular sulfur, without excessive fines, from molten sulfur. Tests are conducted in a Waring blender, a vessel agitated with a Lightnin mixer, and in a laboratory Cowles Dissolver, comprising a five gallon container fitted with a four inch diameter Cowles blade and the associated shaft and motor. In the tests, molten sulfur is poured, over a specified time, into water which is undergoing agitation. The agitation is then either stopped or continued for a specified time. Results are shown in Table III.

EXAMPLE 5

An experiment is performed to illustrate the preparation of sulfur slurries from fertilizer solutions and particulate or molten sulfur, using a high shear mixer. In this experiment, except as otherwise noted, the aqueous fertilizer solution is agitated by a high shear mixer having an impeller peripheral velocity of about 5000 feet per minute. Sulfur, either molten or particulate (produced as in Example 4, supra) is rapidly added. Mixing is continued for about two minutes, and the desired amount of 20 percent Sepiogel clay concentrate is added, followed by the addition of the surfactant

TABLE III

| | Test Number | | | | | | | | | | |
|---|---|---|---|---|---|---|---|---|---|---|---|
| | 1 | 2 | 3 | 4 | 5 | 6 | 7 | 8 | 9 | 10 | 11 |
| Impeller type | Cowles | Cowles | Cowles | Waring | Waring | Waring | Waring | Waring | Waring | Waring | Lightnin |
| Impeller RPM | 4,800 | 4,800 | 4,800 | 3,500 | 3,500 | 3,500 | 3,500 | 7,200 | 20,000 | 23,000 | 1,200 |
| Tip velocity, ft./min. | 5,000 | 5,000 | 5,000 | 1,000 | 1,000 | 1,000 | 1,000 | 2,100 | 5,900 | 6,800 | — |
| Sulfur addition, sec. | 300 | 60 | 30 | 15 | 15 | 15 | 15 | 15 | 15 | 15 | 15 |
| Slurry agitation, sec. | — | — | 30 | 30 | 30 | 120 | 120 | 30 | 30 | 30 | 120 |
| Product % Sulfur | 45 | 45 | 45 | 45 | 25 | 25 | 25 | 45 | 45 | 45 | 25 |
| Screen Analysis, percent | | | | | | | | | | | |
| +6 mesh | 0 | 5.5 | 0 | 0 | 0 | 0 | 0 | 0 | 0 | 0 | 0 |
| +8 | 0 | 5.5 | 2.3 | 15.1 | 31.8 | 8.2 | 2.1 | 26.7 | 0.1 | 0.1 | 50.9 |
| +20 | 11.9 | 43.7 | 38.1 | 44.0 | 40.5 | 40.8 | 28.6 | 44.8 | 18.0 | 3.4 | 30.7 |
| +50 | 43.1 | 31.1 | 38.2 | 26.1 | 14.9 | 28.6 | 43.6 | 15.6 | 46.1 | 45.3 | 12.3 |
| +100 | 15.8 | 6.2 | 10.8 | 7.4 | 6.8 | 12.9 | 13.6 | 7.0 | 15.8 | 22.8 | 3.1 |
| +200 | 9.2 | 4.0 | 5.4 | 6.3 | 4.0 | 5.6 | 9.3 | 4.4 | 17.3 | 24.3 | 1.2 |
| −200 | 20.0 | 4.0 | 5.1 | 1.1 | 2.0 | 3.9 | 2.9 | 1.5 | 2.8 | 4.1 | 1.8 |

Tests 1, 2 and 7 are modified by the addition of 0.1 percent TMulz AO2 to the water prior to sulfur addition.

It should be noted that the high shear impellers produce much fewer particles which are retained on a sieve having 8 mesh openings, as compared to a Lightnin mixer. Also, it can be seen from the Waring blender tests that appropriate adjustment of the impeller speed and mixing time can produce a diversity of particle size distributions, without producing excessive amounts of very fine material, i.e., less than 200 mesh.

EXAMPLE 4

Sulfur suspensions containing 45 percent sulfur are prepared from particulate sulfur, using laboratory high shear mixers. Particulate sulfur, produced according to the process of U.S. Pat. No. 3,637,351 to Young et al., is added to water in a vessel, and the mixture is agitated for a specified time with a high shear mixer. Results are as shown in Table IV, the screen analysis of the particulate sulfur used being shown in the first data column.

TMulz AO2 (to a level of 0.1 percent) and the clay gelling materials potassium chloride and ammonium phosphate (10-34-0), both in sufficient quantity to constitute one percent of the final product. An additional minute of mixing is used to finish the suspension.

Product viscosity is obtained as in Example 3. The volume percentage of clear liquid is measured after each product is allowed to stand undisturbed for seven days, and is a measure of product stability. All suspensions, however, are easily redispersed by mild agitation, such as is obtained by air spraying.

The fertilizer solutions are designated by analysis, with 25-0-0 and 20-0-0 representing aqua ammonia solutions, 32-0-0 representing an ammonia-urea solution, and 29-0-0(S) and 18-0-0-17(S) representing urea-sulfuric acid solutions.

Results are shown in Table V. It should be noted that the surfactant material is added before any sulfur addition in Tests 1 through 6, and that those runs are conducted without any clay or clay gelling materials. Also, there is no addition of 10-34-0 in Tests 7 through 12.

TABLE IV

| Impeller Type | — | Waring | Cowles | Cowles | Cowles | Cowles | Cowles |
|---|---|---|---|---|---|---|---|
| Tip Velocity, ft/min | — | 5,000 | 5,000 | 5,000 | 5,000 | 5,000 | 5,000 |
| Agitation time, min. | — | 2 | 2 | 4 | 6 | 8 | 10 |
| Screen Analysis, Percent | | | | | | | |
| +8 mesh | 29.5 | 0 | 0 | 0 | 0 | 0 | 0 |
| +20 | 39.8 | 0 | 0.2 | 0 | 0 | 0 | 0 |
| +50 | 17.9 | 1.7 | 23.8 | 1.3 | 1.1 | 2.8 | 1.1 |
| +100 | 9.8 | 36.7 | 27.5 | 26.0 | 31.9 | 28.3 | 31.2 |
| +200 | 2.7 | 13.3 | 18.2 | 27.3 | 23.1 | 19.8 | 21.5 |
| −200 | 0.4 | 48.3 | 30.2 | 45.5 | 44.0 | 49.1 | 46.2 |

TABLE V

| Test | Sulfur Type | Fertilizer | Clay, Percent | Product Analysis | Viscosity, Centipoise | Clear Liquid Vol. Percent |
|---|---|---|---|---|---|---|
| 1 | Particulate | 29-0-0-9(S) | — | 25-0-0-20.5(S) | 110 | 60 |
| 2 | " | " | — | 23.2-0-0-27.2(S) | 250 | 40 |

TABLE V-continued

| Test | Sulfur Type | Fertilizer | Clay, Percent | Product Analysis | Viscosity, Centipoise | Clear Liquid Vol. Percent |
|---|---|---|---|---|---|---|
| 3 | " | " | — | 14.5-0-0-54.5(S) | 1,560 | 5 |
| 4 | " | 18-0-0-17(S) | — | 16.2-0-25.3(S) | 300 | 75 |
| 5 | " | " | — | 14.4-0-0-33.6(S) | 550 | 40 |
| 6 | " | " | — | 9-0-0-58.5(S) | 1,860 | 5 |
| 7 | " | 25-0-0 | 1 | 10-0-0-50(S) | 2,020 | 12 |
| 8 | " | 20-0-0 | 1 | 10-0-0-40(S) | 910 | 15 |
| 9 | " | " | 1 | 10-0-0-50(S) | 1,550 | 20 |
| 10 | Molten | 25-0-0 | 1 | 10-0-0-50(S) | 2,230 | 20 |
| 11 | " | 20-0-0 | 1 | 10-0-0-40(S) | 950 | 16 |
| 12 | " | " | 1 | 8-0-0-50(S) | 1,870 | 28 |
| 13 | Particulate | 25-0-0 | 1.5 | 10-0-0-50(S) | 5,400 | 4 |
| 14 | " | 20-0-0 | 1.5 | 10-0-0-40(S) | 2,450 | 12 |
| 15 | " | " | 1.5 | 8-0-0-50(S) | 3,930 | 5 |
| 16 | Molten | 25-0-0 | 1.5 | 10-0-0-50(S) | 5,200 | 13 |
| 17 | " | 20-0-0 | 1.5 | 10-0-0-40(S) | 3,010 | 7 |
| 18 | " | " | 1.5 | 8-0-0-50(S) | 5,840 | 5 |
| 19 | Particulate | " | 2 | 17-0-0-5(S) | 1,330 | 0 |
| 20 | " | " | 2 | 16-0-0-10(S) | 1,450 | 6 |
| 21 | Molten | " | 2 | 17-0-0-5(S) | 1,080 | 0 |
| 22 | " | " | 2 | 16-0-0-10(S) | 1,190 | 3 |
| 23 | Particulate | 32-0-0 | 2 | 27-0-0-5(S) | 880 | 0 |
| 24 | " | " | 2 | 25-0-0-10(S) | 1,050 | 0 |
| 25 | Molten | " | 2 | 27-0-0-5(S) | 860 | 0 |
| 26 | " | " | 2 | 25-0-0-10(S) | 960 | 0 |

EXAMPLE 6

Sulfur suspensions containing 50 percent sulfur are prepared in commercially available high shear mixers. The general procedure followed is (1) charging the mixing vessel with water; (2) starting the agitator or recirculating pump system to prevent settling; (3) rapidly introducing the required amount of particulate sulfur; (4) adding the desired surfactant material; (5) operating the high shear mixer for sufficient time to achieve the desired particle size reduction; and (6) adding the desired thickener before removing the suspension from the system.

Tests A and B are performed in a laboratory Cowles Dissolver, preparing suspensions of a 10 kilogram size, for purposes of comparison. Test A is for a standard Cowles impeller, having projections in the plane of the disc. Test B uses a Cowles "pick-type" impeller, which has projections at its periphery, perpendicular to the plane of the disc.

Test C is conducted in a Chemonics mixer, preparing a 2.2 ton batch of suspension. Tests D and E are in Bard and Bard Bac-U-Mac ™ mixers, preparing a 400 pound batch in D and an 8 ton batch in E. Test F is for a 10 ton suspension batch prepared in a Ferguson Fert-O-Batcher ™, equipped with the high shear Turbulator ™ (similar to a Cowles standard impeller).

Results of the tests are shown in Table VI. Screen analyses are after 10 minutes of mixing, except that Test F is after 7 minutes, with only 5,400 pounds of the sulfur added due to problems with the mixing vessel recirculation system. The column headed "Feed" is an approximate screen analysis of the starting particulate sulfur, obtained as a specification for this material.

TABLE VI

| | Test | | | | | | |
|---|---|---|---|---|---|---|---|
| | A | B | C | D | E | F | Feed |
| Screen Analysis, Percent | | | | | | | |
| +20 mesh | 0 | 0 | 11.6 | 0 | 0 | 2.9 | 69 |
| +50 | 1.1 | 2.2 | 42.0 | 1.4 | 1.1 | 31.1 | 18 |
| +100 | 31.2 | 17.7 | 14.0 | 28.6 | 23.0 | 22.0 | 7 |

TABLE VI-continued

| | Test | | | | | | |
|---|---|---|---|---|---|---|---|
| | A | B | C | D | E | F | Feed |
| −100 | 67.7 | 80.1 | 32.4 | 70.0 | 75.9 | 44.0 | 6 |

EXAMPLE 7

Particle surface areas, a measure of the rate at which sulfur particles will be converted to sulfate in a soil environment, are determined for particles prepared from molten sulfur according to this invention, and for particulate sulfur which has been reduced in size by a high shear mixer in accordance with the invention.

Particulate sulfur, prepared as in U.S. Pat. No. 3,637,351 to Young et al., is described therein as a porous material, having a large surface area which renders the sulfur advantageous for use in agriculture. This sulfur, obtained from two different sources, is used for comparison with particles prepared from molten sulfur.

Samples for surface area measurement are prepared from molten sulfur by rapidly pouring the sulfur onto the high shear impeller, operating in water. The particulate sulfur samples are prepared by rapidly adding the sulfur to the tank of the high shear mixer. In both cases, a sample is taken after two minutes, is dried, and then passed through sieves to separate size fractions for measurement.

Results are shown in Table VII.

TABLE VII

| | Surface Area, Square Centimeters per Gram | | | |
|---|---|---|---|---|
| Mixer (size) | Bard and Bard (400 lb.) | | Cowles Dissolver (10 Kg.) | |
| Sulfur Source | Molten | Particulate | Molten | Particulate |
| Particle Size | | | | |
| −20, +50 mesh | 2,100 | 1,000 | 2,300 | 1,100 |
| −50, +100 | 2,000 | 1,200 | 2,500 | 1,200 |
| −100, +200 | 2,500 | 2,100 | 2,400 | 2,000 |
| −200 | 3,200 | 3,200 | 3,000 | 3,000 |
| Screen Analysis Percent | | | | |
| +20 mesh | 0 | 0 | 0 | 0 |
| +50 | 4 | 3 | 12 | 18 |

TABLE VII-continued

| Mixer (size) Sulfur Source | Bard and Bard (400 lb.) | | Cowles Dissolver (10 Kg.) | |
|---|---|---|---|---|
| | Molten | Particulate | Molten | Particulate |
| +100 | 35 | 27 | 32 | 25 |
| +200 | 21 | 22 | 26 | 23 |
| −200 | 40 | 48 | 30 | 34 |

As can be seen from Table VII, sulfur particles prepared from molten sulfur according to this invention possess significantly higher surface areas for particle sizes of 200 mesh and larger. For this reason, the particles of this invention provide a means for a more rapid release of soluble sulfur to soils.

EXAMPLE 8

Preparation of a maximized amount of fine sulfur particles from molten sulfur is demonstrated in a laboratory high shear mixer. A Cowles standard impeller is operated in water at an impeller peripheral velocity of about 5,000 feet per minute, and sulfur is added in sufficient amount to form a slurry containing 45 percent sulfur.

Results are shown in Table 8. Test A is for sulfur addition to the agitated liquid near the top of the vortex created by the impeller; the addition being conducted over a period of about one minute. Test B is performed in the same manner, except that the water contains 0.1 percent TMulz AO2 surfactant. Test C is for a very rapid sulfur addition (about two seconds) to water containing 0.1 percent TMulz AO2, the sulfur being introduced to the bottom of the vortex, virtually onto the surface of the impeller. The addition rate in Test C is slightly slower than that which would cause flooding of the impeller.

TABLE VIII

| Mixing Time, Minutes | Screen Analysis, percent | | | | | |
|---|---|---|---|---|---|---|
| | 2 | 4 | 5 | 6 | 8 | 10 |
| Test A +20 mesh | 9 | 8 | — | 12 | 10 | 11 |
| +50 | 36 | 28 | — | 33 | 32 | 32 |
| +100 | 20 | 16 | — | 15 | 15 | 13 |
| +200 | 15 | 17 | — | 15 | 16 | 14 |
| −200 | 20 | 31 | — | 25 | 27 | 30 |
| Test B +20 mesh | 8 | 8 | — | 12 | 5 | 3 |
| +50 | 35 | 40 | — | 35 | 33 | 32 |
| +100 | 19 | 17 | — | 15 | 16 | 16 |
| +200 | 9 | 8 | — | 9 | 16 | 14 |
| −200 | 29 | 27 | — | 29 | 30 | 35 |
| Test C +20 mesh | — | — | 0 | — | 0 | 0 |
| +50 | — | — | 9 | — | 9 | 9 |
| +100 | — | — | 25 | — | 21 | 21 |
| +200 | — | — | 20 | — | 18 | 17 |
| −200 | — | — | 46 | — | 52 | 53 |

Comparing the results of Tests A and B, it can be seen that the presence of a surfactant promotes a more rapid formation of fine particles.

The advantage of rapid molten sulfur addition, directed toward the impeller, can be seen in Test C, in which a large amount of fine particles and no +20 mesh particles are formed.

Various embodiments and modifications of this invention have been described in the foregoing description and examples, and further modifications will be apparent to those skilled in the art. Such modifications are included within the scope of the invention as defined by the following claims.

I claim:

1. A process for producing a suspension of sulfur particles which comprises the steps of (a) agitating an aqueous medium, contained within a vessel, with a high shear mixer; and (b) introducing sulfur into the agitated medium.

2. The process defined in claim 1 further comprising the step of adding a clay thickener to the produced suspension.

3. The process defined in claim 1 wherein the aqueous medium contains a surfactant material.

4. The process defined in claim 1 wherein the aqueous medium comprises water.

5. The process defined in claim 1 wherein the aqueous medium comprises a fertilizer solution or suspension.

6. The process defined in claim 1 wherein the introduced sulfur is in a molten state.

7. The process defined in claim 1 wherein the introduced sulfur is particulate, with more than about 50 percent by weight of the particles having a size larger than about 20 mesh.

8. The process defined in claim 1 wherein the produced suspension contains from about 10 to about 70 percent by weight of sulfur.

9. A process for producing sulfur particles which comprises the steps of (a) agitating an aqueous medium, contained within a vessel, with a high shear mixer, and (b) introducing molten sulfur into the agitated medium.

10. The process defined in claim 9, further comprising the steps of (c) passing the produced particles and medium through a sieve having openings of about 20 mesh; (d) allowing the particles to settle; and (e) drawing off the particles as a suspension containing from about 20 percent to about 60 percent by weight sulfur.

11. The process defined in claim 10, further comprising the step of adding a clay thickener to the suspension.

12. The process defined in claim 10, wherein sulfur particles which do not pass through the sieve are collected and introduced into an aqueous medium, contained within a vessel and agitated with a high shear mixer, so as to produce a sulfur suspension.

13. A process for producing a suspension of sulfur particles, of which more than about 25 percent by weight have a particle size of less than about 200 mesh, which comprises the steps of (a) charging a vessel with an aqueous medium; (b) adding a surfactant material to the aqueous medium, in an amount effective to prevent excessive foam formation during the process, up to about two percent of the weight of the aqueous medium; (c) agitating the aqueous medium and contained surfactant material with a high shear mixer; (d) introducing sulfur, selected from the group consisting of molten sulfur and particulate sulfur, into the agitated aqueous medium; and (c) adding a clay thickener to the agitated aqueous medium.

14. The process defined in claim 13 wherein the aqueous medium comprises water.

15. The process defined in claim 13 wherein the aqueous medium comprises a fertilizer solution or suspension.

16. The process defined in claim 13 wherein a surfactant material comprises an ethoylated alkyl phenol.

17. The process defined in claim 13 wherein the particulate sulfur is porous.

18. A suspension of sulfur particles in an aqueous medium prepared according to the process of claim 1.

19. A particulate sulfur prepared according to the process of claim 9.

20. A suspension of sulfur particles in an aqueous medium prepared according to the process of claim 10.

21. A suspension of sulfur particles in an aqueous medium prepared according to the process of claim 12.

22. A suspension of sulfur particles in an aqueous medium prepared according to the process of claim 13.

* * * * *